United States Patent
Rice

(10) Patent No.: US 12,337,957 B2
(45) Date of Patent: Jun. 24, 2025

(54) ROTOR BLADE AND PRESSURE REGULATING ARRANGEMENT

(71) Applicant: Genesis Aerotech Limited, Fintona (GB)

(72) Inventor: Michael Rice, Fintona (GB)

(73) Assignee: GENESIS AEROTECH LIMITED, Tyrone (GB)

( * ) Notice: Subject to any disclaimer, the term of this patent is extended or adjusted under 35 U.S.C. 154(b) by 0 days.

(21) Appl. No.: 18/039,325

(22) PCT Filed: Nov. 30, 2021

(86) PCT No.: PCT/EP2021/083664
§ 371 (c)(1),
(2) Date: May 30, 2023

(87) PCT Pub. No.: WO2022/112616
PCT Pub. Date: Jun. 2, 2022

(65) Prior Publication Data
US 2024/0002042 A1   Jan. 4, 2024

(30) Foreign Application Priority Data
Nov. 30, 2020   (GB) ..................................... 2018795

(51) Int. Cl.
*B64C 27/46*   (2006.01)
*B64C 21/04*   (2023.01)
*B64C 27/18*   (2006.01)

(52) U.S. Cl.
CPC .............. *B64C 27/46* (2013.01); *B64C 21/04* (2013.01); *B64C 27/18* (2013.01)

(58) Field of Classification Search
None
See application file for complete search history.

(56) References Cited

U.S. PATENT DOCUMENTS

| 2,679,295 | A | 5/1954 | Parsons |
| 3,005,496 | A | 10/1961 | Nichols |
| 3,381,922 | A | 5/1968 | Laing |
| 7,832,689 | B2 | 11/2010 | Prince et al. |
| 7,931,445 | B2 * | 4/2011 | Haans ..................... F03D 80/55 416/1 |
| 8,382,043 | B1 * | 2/2013 | Raghu ..................... F15D 1/008 244/1 N |

(Continued)

FOREIGN PATENT DOCUMENTS

| GB | 634 332 A | 3/1950 |
| GB | 774 396 A | 5/1957 |

(Continued)

OTHER PUBLICATIONS

International Search Report and Written Opinion dated Feb. 10, 2022 for corresponding PCT/EP2021/083664 (13 pp).

*Primary Examiner* — Juan G Flores
(74) *Attorney, Agent, or Firm* — Renner, Kenner; Arthur M. Reginelli

(57) ABSTRACT

A rotor blade, the rotor blade comprising a cavity and one or more nozzles for the expulsion of compressed air from the rotor blade cavity thereby resulting in rotation of the rotor blade. The rotor blade further comprises a pressure regulating arrangement, the pressure regulating arrangement being operable to release compressed air from the rotor blade cavity.

19 Claims, 6 Drawing Sheets

(56) References Cited

U.S. PATENT DOCUMENTS

| | | | |
|---|---|---|---|
| 9,637,229 B2* | 5/2017 | van der Westhuizen | ................... B64C 27/26 |
| 10,302,064 B2* | 5/2019 | Clingman | ............... B64C 21/04 |
| 2008/0141653 A1 | 6/2008 | Peck | |
| 2010/0143123 A1* | 6/2010 | Haans | ................... F03D 1/0608 416/1 |
| 2016/0001881 A1* | 1/2016 | van der Westhuizen | ................... B64C 27/26 244/17.11 |
| 2017/0029102 A1* | 2/2017 | Clingman | ............. B64C 27/001 |

FOREIGN PATENT DOCUMENTS

| | | |
|---|---|---|
| GB | 2 080 230 A | 2/1982 |
| WO | 2005/003545 A1 | 1/2005 |

\* cited by examiner

ROTOR BLADE AND PRESSURE REGULATING ARRANGEMENT

The present invention relates to a rotor blade. In particular, the present invention relates to a rotor blade for a reaction jet helicopter.

The rotor blades of reaction jet or "tip jet" helicopters are powered by forcing air through nozzles at the blade tips, resulting in reactive forces powering rotation of the blades and providing lift and propulsion. Powering rotation of the rotor blades at their tips as opposed to from a central shaft overcomes issues with the torque of the central shaft causing rotation of the fuselage in an opposite direction to the rotation of the rotor. Accordingly, reaction-jet helicopters do not require an antitorque rotor (tail rotor). A considerable amount of helicopter accidents results from malfunctioning tail rotors and so obviating their requirement provides improved safety over shaft-driven helicopters. Reaction jet helicopters are also substantially less complex than central shaft helicopters as none of the machinery to operate a tail rotor is required. This reduces manufacturing cost and complexity, overall cost, and the amount of skill and training required to operate. Maintenance costs are also significantly reduced which accounts for a large proportion of the ongoing ownership costs of helicopters. Pressure-jet helicopters utilize compressed air forced out of the rotor blade nozzles to power rotation. Typically, these helicopters have an engine which powers a compressor to force air through a duct to a distribution hub where it is then distributed into and along cavities within the rotor blades and out through the nozzles.

Reaction-jet helicopters are known, yet production and usage of reaction-jet helicopters remains much lower than that of central shaft helicopters. The control of output air pressure from the compressor is managed by adjustment of the compressor blade angle, which requires constant pilot input to balance the air demand. The rotor blade nozzles are custom converging-diverging nozzles which operate at an optimal pressure ratio to maximize thrust. In some instances, the air pressure in the duct can exceed a threshold amount, resulting in excess pressure at the nozzle inlet. This reduces thrust efficiency and can induce compressor stall and back flow surge.

It is an object of the invention to obviate or mitigate the problems with reaction jet helicopters outlined above.

It is a further object of the invention to reduce the frequency of or prevent stalling in reaction jet helicopters.

According to a first aspect of the invention there is provided a rotor blade, the rotor blade comprising a cavity and one or more nozzles for the expulsion of compressed air from the rotor blade cavity thereby resulting in rotation of the rotor blade, the rotor blade further comprises a pressure regulating arrangement, the pressure regulating arrangement being operable to release compressed air from the rotor blade cavity.

Preferably, the pressure regulating arrangement is operable to release pulses of compressed air from the rotor blade cavity.

Advantageously, releasing pulses of compressed air from the cavity increases the turbulent mixing between the low momentum fluid close to the surface and the outer parts of the boundary layer thereby maintaining boundary layer attachment to the rotor blade.

Ideally, the pressure regulating arrangement is operable to release pulses of compressed air from the rotor blade cavity via a pressure supply line running through the rotor blade cavity.

Preferably, the pressure regulating arrangement comprises one or more valves operable to release air from the rotor blade cavity.

By valve we mean any mechanical device capable of regulating the flow of fluid.

Advantageously, air can be released from the rotor blade cavity via the one or more valves, for example to reduce pressure in the event of buildup of excess pressure. This reduces backflow of air towards the compressed air source so that reduction in lift is minimized.

Further advantageously, the engine stall is reduced or prevented.

Preferably, the pressure regulating arrangement comprising a plurality of valves.

Advantageously, the plurality of valves enables pressure regulation to occur at a plurality of locations on the rotor blade, for example, at two or more points along the rotor blade.

Preferably, the one or more valves are mounted in the rotor blade.

Ideally, the rotor blade comprises one or more outlet apertures.

Preferably, the pressure regulating arrangement comprises one or more outlet apertures.

Advantageously, the outlet apertures provide an outlet for high pressure air thereby reducing choke.

Preferably, the one or more outlet apertures being in fluid communication with the one or more valves, most preferably, via one or more pathways.

Ideally, each outlet aperture being in fluid communication with a corresponding valve, most ideally, via a pathway.

Ideally, the one or more outlet apertures are slots.

Ideally, the outlet apertures are spaced from one another.

Ideally, the outlet apertures are skewed relative to one another.

Ideally, adjacent outlet apertures are configured in a V-shape.

Preferably, the outlet apertures are arranged in pairs.

Preferably, the pairs are angled towards each other in a V-shape.

Ideally, the pairs are angled towards each other in a V-shape towards the trailing edge of the rotor blade.

Ideally, the outlet apertures are configurable to generate co-rotating micro vorticities.

Advantageously, the orientation of the one or more outlet apertures produces a crossflow component thereby inducing vorticity in the boundary layer to allow augmented lift at higher blade incidences.

Further advantageously, the orientation of the one or more outlet apertures aids in increasing turbulent mixing thereby maintaining boundary layer attachment.

Ideally, orientation of the one or more outlet apertures relative to the rotor blade surface accelerates flow over the rotor blade upper surface towards the trailing edge of the rotor blade.

Preferably, the one or more outlet apertures are located at any distance between the leading edge and trailing edge of the rotor blade.

Preferably, the one or more outlet apertures are located at or about the leading edge of the rotor blade.

Preferably, the one or more outlet apertures are located at a distance of at least 5% of the total distance from the leading edge to the trailing edge.

Preferably, the one or more outlet apertures are located at a distance of at least 10% of the total distance from the leading edge to the trailing edge.

Preferably, the one or more outlet apertures are located at a distance of at least 15% of the total distance from the leading edge to the trailing edge.

Preferably, the one or more outlet apertures are located at a distance of at least 20% of the total distance from the leading edge to the trailing edge.

Preferably, the one or more outlet apertures are located at a distance of at least 25% of the total distance from the leading edge to the trailing edge.

Advantageously, the location of the one or more outlet apertures means that when air is exhausted from the outlet aperture over the blade leading edge, it can augment lift.

Ideally, the one or more outlet apertures are located along the length of the rotor blade.

Ideally, the one or more outlet apertures are integrated into one or more inserts mounted on the rotor blade.

Ideally, the pressure regulating arrangement comprises one or more fluid pathways.

Preferably, the pressure regulation arrangement comprises one or more plenum chambers.

Preferably, the one or more pathways comprise a plenum chamber.

Ideally, each pathway comprises a plenum chamber.

Advantageously, each plenum chamber equalizes the air pressure supply to an individual outlet aperture along the rotor blade upper surface.

Further advantageously, the use of a plenum chamber reduces unsteadiness in the outflow.

Preferably, the one or more plenum chambers are in fluid communication with the one or more outlet apertures.

Ideally, each plenum chamber is in direct fluid communication with the outlet apertures.

Ideally, the plenum chamber is in fluid communication with a corresponding valve.

Preferably, the one or more outlet apertures comprise an outlet channel.

Preferably, the one or more pressure regulating pathways have an outlet channel in fluid communication with the plenum chamber and the one or more outlet apertures.

Preferably, the one or more valves having a closed configuration and an open configuration.

Preferably, the one or more valves comprise an inlet aperture and a valve body for releasably blocking the valve inlet aperture.

Ideally, the one or more valves comprise an inlet aperture and a valve body for releasably blocking the flow to the leading edge outlet apertures.

Ideally, the one or more valves comprise a shaft sized to pass through the inlet aperture.

Preferably, the one or more valves comprise a head sized such that it cannot pass through the inlet aperture.

Advantageously, the head stops movement of the valve in at least one direction.

Ideally, the one or more valves comprise a biasing means for biasing the one or more valves towards the closed configuration.

Ideally, the biasing means comprises a spring.

Advantageously, the biasing means urges the one or more valves into the closed configuration without manual input.

Ideally, the spring is a coiled spring.

Ideally, the shaft is connected at one end to the head.

Ideally, a portion of the shaft faces into the rotor blade cavity at another end.

Ideally, the head is connected at one end to the shaft and is operably engaged at the other end to the biasing means.

Ideally, at least part of the one or more valves is formed, most preferably shaped, to be moveable by air especially compressed air.

Preferably, at least part of the one or more valves is formed, most preferably shaped, to be moveable via direct actuation by air especially compressed air.

Ideally, the compressed air directly actuates movement of the valve when the pressure in the cavity exceeds a desirable preset value.

Ideally, the pressure regulating arrangement is configured so that the one or more valves are actuated at a pre-determined compressed air pressure.

Advantageously, this enables air in the rotor blade cavity to open the one or more valves when the air pressure is at or above a pre-determined level.

Preferably, the one or more valves are configurable to react to changing static pressure within the rotor blade cavity.

Ideally, the one or more valves are configurable to change configuration based on a change in static pressure within the rotor blade cavity.

Preferably, the one or more valves are configurable to react to unsteady flow within the rotor blade cavity to provide consistent pulsed output of compressed air from the outlet apertures.

Advantageously, this consistent pulsing increases the turbulent mixing between the low momentum fluid close to the surface and the outer parts of the boundary layer.

Alternatively, the pressure regulation arrangement is configured so that the one or more valves are actuated based on a pre-determined duty cycle.

Preferably, the inlet aperture provides fluid communication between the rotor blade cavity and the one or more pathways.

Advantageously, the inlet aperture allows compressed air flow to exit the rotor blade cavity into the one or more pathways.

Preferably, the inlet aperture is sealable by the head.

Advantageously, the head prevents air from exiting the rotor blade cavity, which is the normal operation of the one or more valves, when air pressure is below a pre-determined level in the rotor blade cavity.

Ideally, the one or more valves are adjustable to open at a range of pre-determined levels of air pressure.

Ideally, the one or more valves are manually adjustable.

Ideally, the one or more valves are manually adjustable, prior to installation, by tightening, loosening, adding, removing or replacing component parts, such as a spring or springs of the biasing means.

Advantageously, the adjustability of the one or more valves enables a range of preset air pressure to open the one or more valves. This provides a range of preset valves to match a range of flight conditions.

Further advantageously, the adjustability of the one or more valves enables adjustment of differential setting to focus slots on outer span to modify spanwise distribution.

Ideally, the one or more valves are mechanically operated.

Ideally, the one or more valves or electrically operated.

Ideally, the one or more valves are operated through a closed loop control system.

Ideally, the one or more valves are operated through a closed loop control system for various parts of flight envelope.

Advantageously, this enables a range of air pressure to open the one or more valves according to the various parts of flight envelope.

Ideally, the one or more valves comprise one or more actuators to actuate electrical or electronic opening and/or closing of the one or more valves during various parts of flight envelope.

Ideally, the one or more valves comprise one or more actuators to automatically actuate electrical/electronic opening and/or closing of the one or more valves during various parts of flight envelope.

Ideally the actuators are operably coupled to pressure sensors.

Preferably, the one or more pressure regulating pathways extend from the cavity of the rotor blade through the body of the leading-edge spar portion and out through the upper surface of the leading spar portion.

Preferably, the shaft is formed to move through the inlet aperture when the one or more valves move between an open and closed configuration.

Ideally, the shaft is coaxial or substantially coaxial with the inlet aperture.

Ideally, the one or more valves comprising a seat for engaging with the head.

Advantageously, the seat limits movement of the head in one direction.

Preferably, the seat is disposed within the inlet aperture.

Advantageously, the seat further prevents the head from passing through the inlet aperture.

Preferably, the seat comprising one or more engaging faces.

Advantageously, the one or more engaging faces enable optimum engagement of the seat with the head thereby enabling the head to seal the inlet aperture.

Preferably, the head is shaped to engage with the seat when the valve is in the closed position.

Ideally, the one or more engaging faces taper towards the aperture.

Advantageously, the one or more engaging faces guide the head into the position when the head is urged towards the inlet aperture, via the biasing means, as in the closed configuration of the valve.

Ideally, the head has a tapered face shaped to correspond with the one or more engaging faces of the seat.

Advantageously, in the closed configuration, the corresponding shape of the head provides maximum engagement of the head with the seat and thereby provides maximum seal and prevents the head from sliding or moving laterally.

Preferably, the one or more outlet apertures are located on the rotor blade, most preferably on the upper surface.

Preferably, when air pressure in the rotor blade cavity exceeds a pre-determined level, it forces the head away from the seat against the force of the biasing means thereby opening the one or more valves.

Advantageously, opening the one or more valves allows compressed air to escape from the rotor blade cavity and thereby minimizes thrust reduction and compressor stall when pressure exceeds a safe level within the rotor blade cavity.

Preferably, when the one or more valves are in an open position the compressed air flows from the rotor blade cavity through the inlet aperture into the plenum chamber to the one or more outlet channels and through the one or more outlet apertures on the upper rotor blade surface.

Preferably, when the compressed air pressure is below the pre-determined level, the biasing means urges the head against the seat thereby closing the one or more valves.

Preferably, when the one or more valves are in a closed position the inlet aperture is closed and there is no air flow from the rotor blade cavity to the one or more pathways.

The invention will now be described with reference to the accompanying drawings, which show one embodiment of the invention by way of example only:

Figure 1:
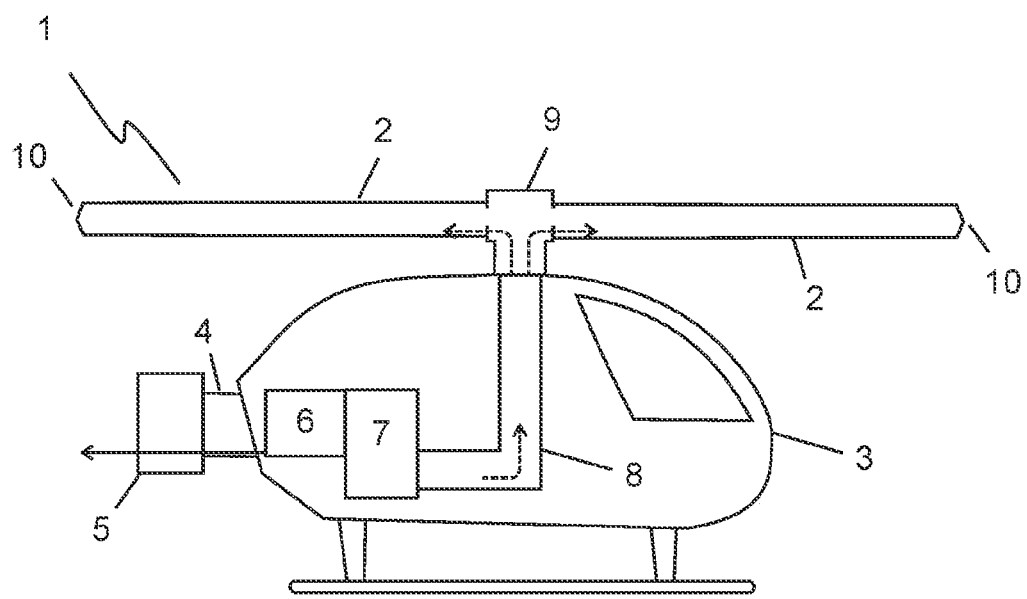
FIG. 1 shows a schematic side view of a reaction jet helicopter with a rotor blade according to the invention.
Figure 2:
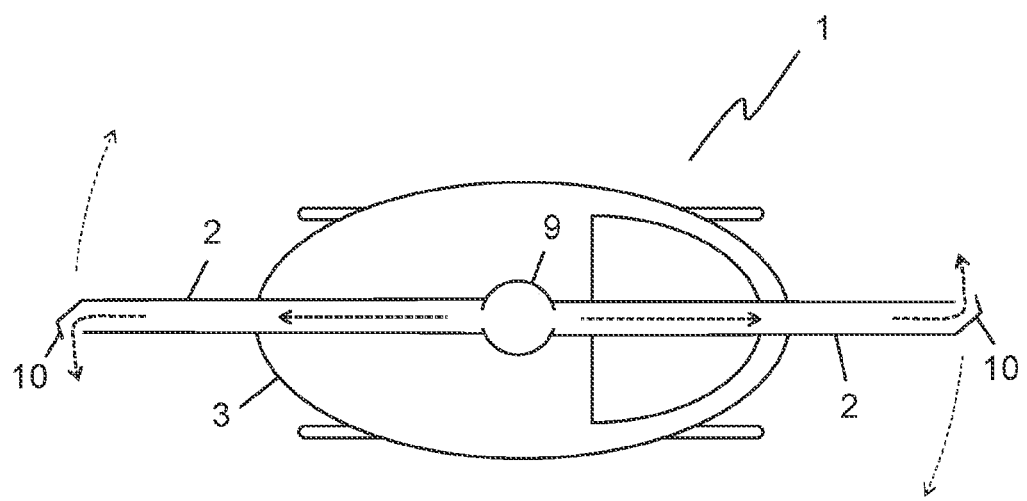
FIG. 2 shows a top view of the helicopter in FIG. 1.

In the drawings there is shown a reaction jet helicopter according to the invention indicated generally by reference numeral 1. The helicopter 1 has a fuselage 3, engine 6, tail boom 4 and rudder 5. The propulsion system of the helicopter 1 has a compressor 7, duct 8, distributor hub 9, rotor blade 2 and jet nozzles 10. Compressor 7 is used to convert atmospheric-pressure air, input via a compressor inlet pipe (not shown), into compressed gas. When compressed gas from compressor 7 is exhausted into a lower-pressure atmosphere, a flow of gas is produced. In the preferred embodiment compressor 7 is a turbine-driven air compressor and is powered by a primary power source in the form of engine 6. The flow of air travels through the duct 8 and into the rotor blade cavity 11 in the rotor blade 2.

Referring more particularly FIGS. 3 to 7, there is shown a rotor blade 2, the rotor blade 2 having a cavity 11 and nozzles 10 for the expulsion of compressed air from the rotor blade cavity 11 thereby resulting in rotation of the rotor blade 2. The rotor blade 2 further has a pressure regulating arrangement indicated generally by the reference numeral 12. The pressure regulating arrangement 12 is operable to release compressed air from the cavity 11. The pressure regulating arrangement 12 has twenty valves 13 operable to release air from the blade cavity 11. It will of course be appreciated that twenty valves are described with reference to the drawings however the invention is no way limited by the number of valves and any number of valves suitable to carry out the function of pressure regulation is encompassed within the scope of the invention. By valve 13 we mean any mechanical device capable of regulating the flow of fluid. This means that air can be released from the blade cavity 11 via the valves 13 to reduce pressure in the event of buildup of excess pressure. This reduces backflow of air towards the compressed air source 7 so that reduction in lift is minimized and the risk of engine stall is reduced or prevented.

Figure 4:
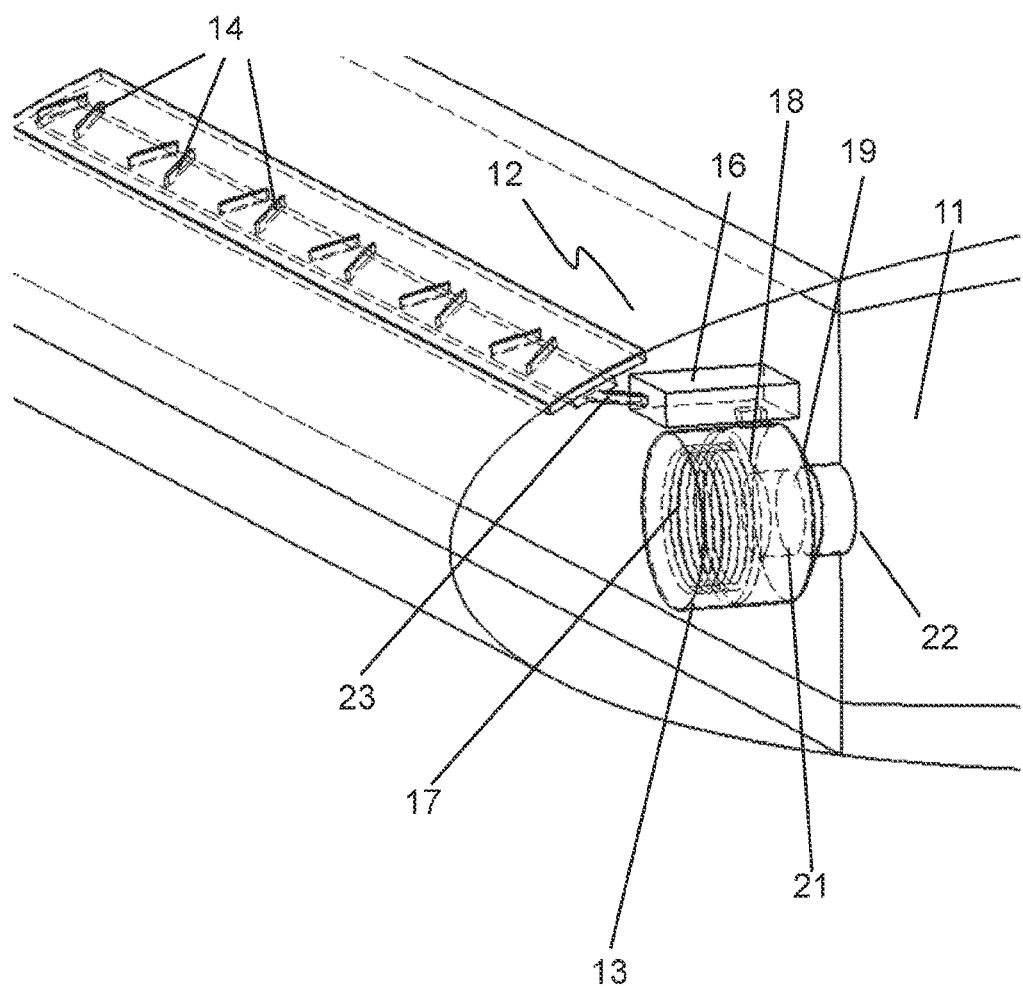
FIG. 4 shows a perspective view of a rotor blade of a reaction jet helicopter comprising a pressure regulating arrangement according to the invention.
Figure 6:
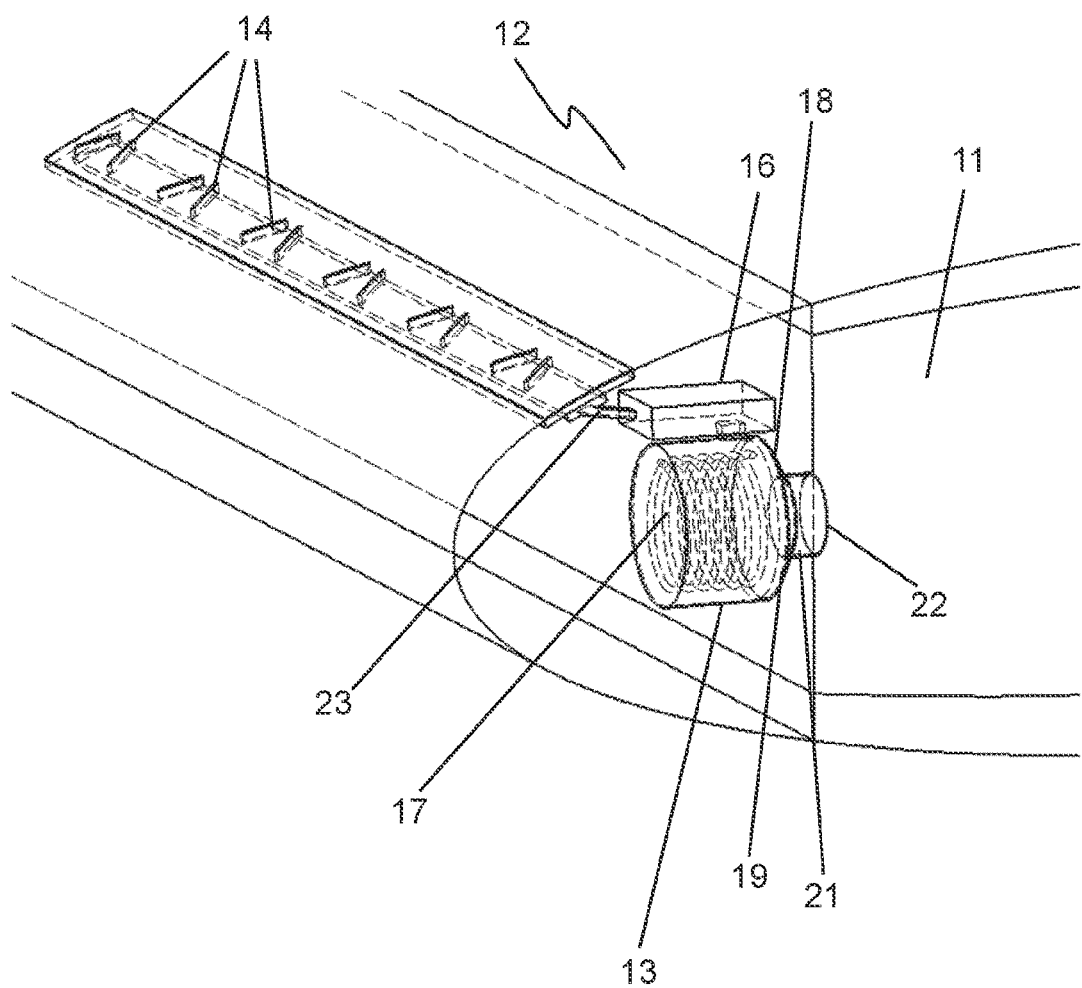
FIG. 6 shows a second perspective view of a rotor blade of a reaction jet helicopter comprising a pressure regulating arrangement according to the invention.
Figure 7:
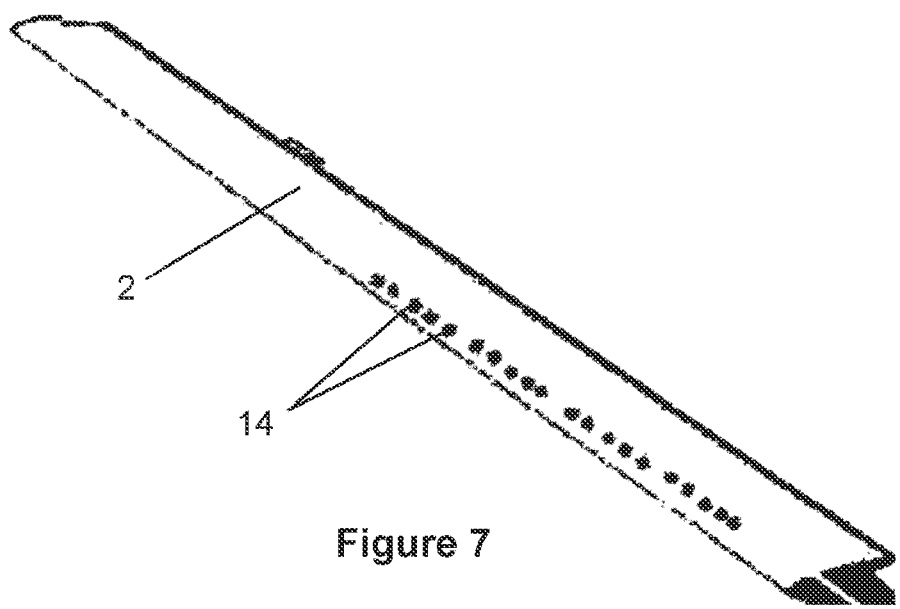
FIG. 7 shows a perspective view of a rotor blade of a reaction jet helicopter according to the invention.

The pressure regulating arrangement 12 has a plurality of valves 13. The plurality of valves 13 enables pressure regulation to occur at a plurality of locations, for example, at twenty or more points along the rotor blade 2. The valves 13 are mounted in the rotor blade 2. The rotor blade 2 has twenty outlet apertures 14 The pressure regulating arrangement 12 has twenty outlet apertures 14. This means that the outlet apertures 14 provide an outlet for high pressure air, via the movement of the valve, thereby reducing choke. The outlet apertures 14 are in fluid communication with the valves 13 via one or more pathways indicated generally by the reference numeral 15. In this embodiment, each outlet aperture 14 is in fluid communication with a corresponding valve 13. In this embodiment, adjacent outlet apertures are in a V-shape, as illustrated in FIGS. 4 and 6. The outlet apertures 14 are located on the rotor blade 2, most preferably on the upper surface. Orientation of the outlet apertures 14 relative to the surface of rotor blade 2 accelerates flow over the upper surface of rotor blade 2 towards the trailing edge of the rotor blade 2. The outlet apertures 14 are located at any distance between the leading edge and trailing edge of the rotor blade 2. The outlet apertures 14 are located at or about the leading edge of the rotor blade 2. The outlet apertures 14 are located at a distance of at least 5% to at least 25% of the total distance from the leading edge to the trailing edge of the rotor blade 2. The outlet apertures 14 are integrated into inserts mounted on the rotor blade 2. The pressure regulating arrangement has one or more plenum chambers 16. The one or more pathways 15 have a plenum chamber 16. Each pathway 15 has a plenum chamber 16. Each plenum chamber 16 equalizes the air pressure supply to an individual outlet aperture 14 along the rotor blade 2 upper surface. The one or more plenum chambers 16 are in fluid communication with the outlet apertures 14. Each plenum chamber 16 is in fluid communication with a corresponding outlet aperture 14.

Figure 5:
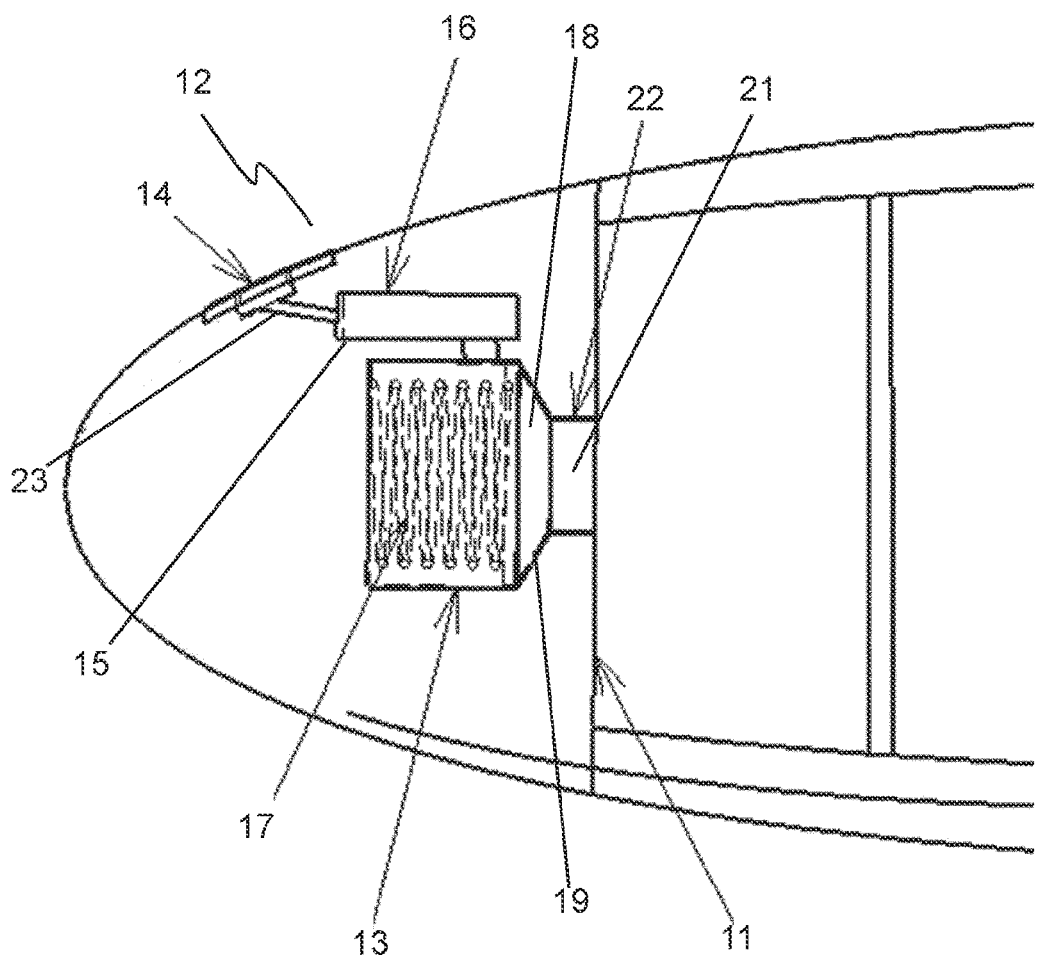
FIG. 5 shows a second cross-section view of a rotor blade of a reaction jet helicopter comprising a pressure regulating arrangement according to the invention.

Each plenum chamber 16 is in fluid communication with a corresponding valve 13. The outlet apertures 14 have an outlet channel 23. The pressure regulating pathways 15 have an outlet channel 23 in fluid communication with the plenum chamber 16 and the outlet aperture 14. The valves 13 having a closed configuration and an open configuration. The valves 13 have an inlet aperture 22 and a valve body for releasably blocking the inlet aperture 22 and releasably blocking the flow to the leading edge outlet apertures 14. The valves 13 have a shaft 21 sized to pass through the inlet aperture 22. The valves 13 have a head 18 sized such that it cannot pass through the inlet aperture 22. Therefore, the head 18 stops movement of the valves 13 in at least one direction. The valves 13 have a biasing arrangement 17 for biasing the valves 13 towards the closed configuration. The biasing arrangement 17 is a spring in this instance although it will be appreciated that other biasing arrangements are suitable for use with the valves. Therefore, the biasing arrangement 17 urges the valves 13 into the closed configuration, as illustrated in FIGS. 5 and 6, without manual input. In the embodiment shown, the spring 17 is a coiled spring 17. The shaft 21 is connected at one end to the head 18. A portion of the shaft 21 faces into the rotor blade cavity 11 at the other end. The head 18 is connected at one end to the shaft 21 and is operably engaged at the other end to the biasing arrangement 17.

At least part of the valves 13 are formed, most preferably shaped, to be moveable by air especially high-pressure air. In this embodiment, at least part of the valves 13 are formed, most preferably shaped, to be moveable via direct actuation by air especially compressed air. The compressed air directly actuates movement of the valve 13 when the pressure in the cavity 11 exceeds a desirable preset value.

The pressure regulating arrangement 12 is configured so that the valves 13 are actuated at a pre-determined compressed air pressure. This enables air in the rotor blade cavity 11 to open the valves 13, against the force of the biasing arrangement 17, when the air pressure is at or above a pre-determined level. The inlet aperture 22 provides fluid communication between the blade cavity 11 and the pathways 15. Therefore, the inlet aperture 22 allows compressed air flow to exit the rotor blade cavity 11 into the pathways 15. The inlet aperture 22 is sealable by the head 18.

Therefore, the head 18 prevents air from exiting the rotor blade cavity 11, which is the normal operation of the valves, when air pressure is below a pre-determined level in the rotor blade cavity 11.

The valves 13 are adjustable to open at a range of pre-determined levels of air pressure. The valves 13 are manually adjustable. The valves 13 are manually adjustable, prior to installation, by tightening, loosening, adding, removing or replacing component parts, such as a spring or springs of the biasing arrangement 17. The adjustability of the valves 13 enables a range of preset air pressure to open the valves 13. This provides a range of preset valves to match a range of flight conditions.

The valves 13 are mechanically operated. The valves 13 are electrically operated such as a solenoid valve. The valves 13 are operated through a closed loop control system. The valves 13 are operated through a closed loop control system for various parts of flight envelope. This enables a range of air pressures to open the valves 13 according to the various parts of flight envelope. The valves 13 have one or more actuators 31 to actuate electrical or electronic opening and/or closing of the valves 13 during various parts of flight envelope. The valves 13 have one or more actuators 31 to automatically actuate electrical/electronic opening and/or closing of the valves 13 during various parts of flight envelope. The actuators are operably coupled to pressure sensors 32.

The pressure regulating pathways 15 extends from the rotor blade cavity 11 through the body of the leading-edge spar portion and out through the upper surface of the leading-edge spar portion. The shaft 21 is formed to move through the inlet aperture 22 when the valves 13 move between an open and closed configuration. The shaft 21 is coaxial or substantially coaxial with the inlet aperture 22. The valves 13 have a seat 19 for engaging with the head 18. Therefore, the seat 19 limits movement of the head 18 in one direction. The seat 19 is disposed within the inlet aperture 22. The seat 19 further prevents the head 18 from passing through the inlet aperture 22.

The seat 19 has one or more engaging faces. Therefore, the engaging faces enable optimum engagement of the seat 19 with the head 18 thereby enabling the head 18 to seal the inlet aperture 22.

The head 18 is shaped to engage with the seat 19 when the valves 13 are in the closed position. The engaging faces taper towards the inlet aperture 22. The engaging faces of the seat 19 guides the head 18 into position when the head 18 is urged towards the inlet aperture 22, via the biasing arrangement 17, as in the closed configuration of the valves 13. The head 18 has a tapered face shaped to correspond with the engaging face of the seat 19. Therefore, in the closed configuration, the corresponding shape of the head 18 provides maximum engagement of the head 18 with the seat 19 and thereby provides maximum seal and prevents the head 18 from sliding or moving laterally.

Figure 3:
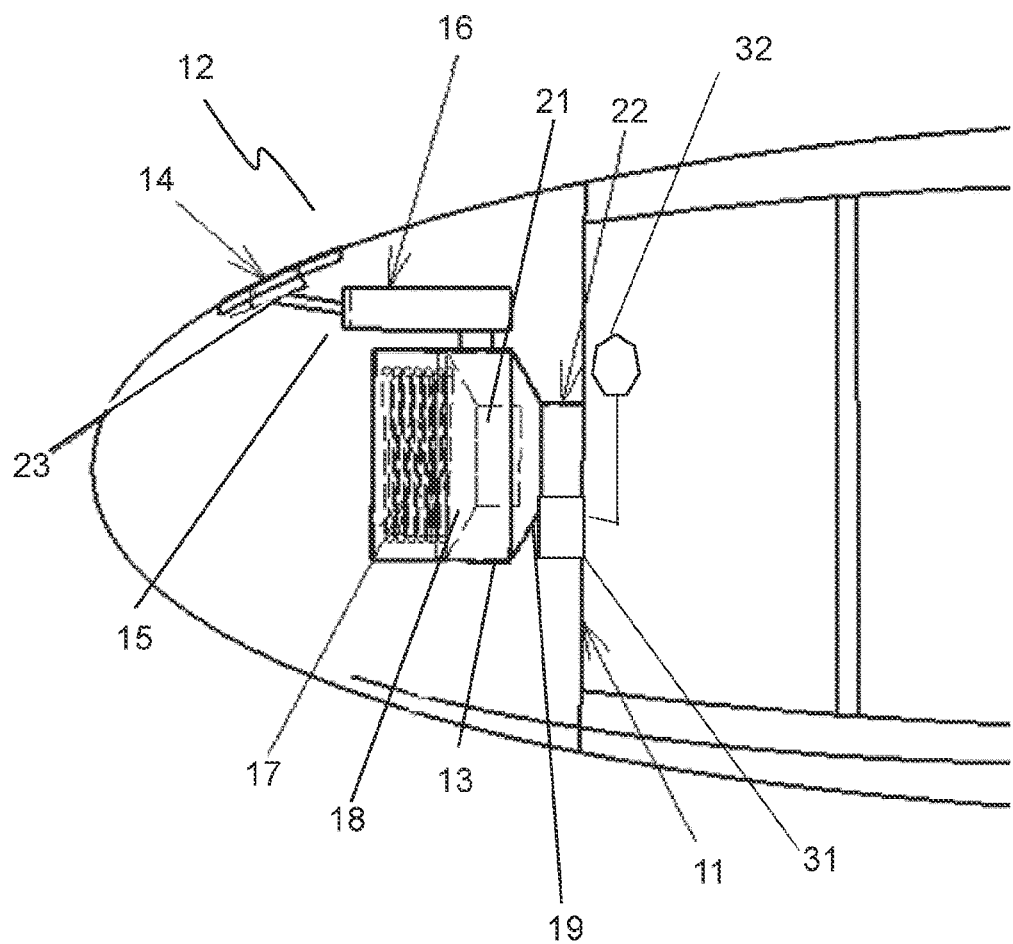
FIG. 3 shows a cross-section of a rotor blade of a reaction jet helicopter comprising a pressure regulating arrangement according to the invention.

When air pressure in the rotor blade cavity 11 exceeds a pre-determined level, it forces the head 18 away from the seat 19 against the force of the biasing arrangement 17 thereby opening the valves 13, as illustrated in FIGS. 3 and 4. Opening the valves 13 allows compressed air to escape from the rotor blade cavity 11 and thereby minimizes thrust reduction and compressor stall when pressure exceeds a safe level within the rotor blade cavity 11.

When the valves 13 are in an open position the compressed air flows from the rotor blade cavity 11 through the inlet aperture 22 into the plenum chamber 16 to the outlet channel 23 and through the outlet apertures 14 on the upper surface of rotor blade 2. When the compressed air pressure is below the pre-determined level, the biasing arrangement 17 urges the head 18 against the seat 19 thereby closing valves 13, as illustrated in FIGS. 5 and 6. When the valves 13 are in a closed position the inlet aperture 22 is closed and there is no air flow from the rotor blade cavity 11 to the pathway 15.

Various modifications will be apparent to those skilled in the art. For example, the biasing means may be formed from different springs or a plurality of springs. The valves can be any type of one-way valve provided it is operable at the high-pressures of the blade cavities. The shape of the pathways can be altered and the location and number of the valves along the blade may also be altered.

In the preceding discussion of the invention, unless stated to the contrary, the disclosure of alternative values for the upper or lower limit of the permitted range of a parameter, coupled with an indication that one of the values is more highly preferred than the other, is to be construed as an implied statement that each intermediate value of the parameter, lying between the more preferred and the less preferred of the alternatives, is itself preferred to the less preferred value and also to each value lying between the less preferred value and the intermediate value.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof as defined in the appended claims.

The invention claimed is:

1. A rotor blade for a reaction jet helicopter, the rotor blade comprising a cavity and one or more nozzles for the expulsion of compressed air from the rotor blade cavity thereby resulting in rotation of the rotor blade, the rotor blade further comprises a pressure regulating arrangement, the pressure regulating arrangement being operable to release compressed air from the rotor blade cavity, wherein the rotor blade further comprises one or more outlet apertures, wherein the pressure regulating arrangement comprises one or more fluid pathways, wherein the one or more fluid pathway comprises a plenum chamber, each plenum chamber equalizing an air pressure supply to the one or more outlet apertures along an upper surface of the rotor blade, wherein the pressure regulating arrangement comprises one or more valves operable to release air from the rotor blade cavity, wherein compressed air travelling through the cavity does not have to pass through the one or more valves to reach the one or more nozzles.

2. The rotor blade for a reaction jet helicopter as claimed in claim 1, wherein the pressure regulating arrangement is operable to release pulses of compressed air from the rotor blade cavity.

3. The rotor blade for a reaction jet helicopter as claimed in claim 1, wherein the pressure regulating arrangement is operable to release pulses of compressed air from the rotor blade cavity via a pressure supply line running through the rotor blade cavity.

4. The rotor blade for a reaction jet helicopter as claimed in claim 1, wherein the one or more valves comprise a plurality of valves, the plurality of valves enabling pressure regulation to occur at a plurality of locations on the rotor blade.

5. The rotor blade for a reaction jet helicopter as claimed in claim 1, wherein the one or more outlet apertures are arranged in pairs, the pairs are angled towards each other in a V-shape towards a trailing edge of the rotor blade.

6. The rotor blade for a reaction jet helicopter as claimed in claim 1, wherein the one or more outlet apertures are configurable to generate co-rotating micro vorticities, the orientation of the one or more outlet apertures produces a crossflow component thereby inducing vorticity in a boundary layer to allow augmented lift at higher blade incidences.

7. The rotor blade for a reaction jet helicopter as claimed in claim 1, wherein the one or more outlet apertures are integrated into one or more inserts mounted on the rotor blade.

8. The rotor blade for a reaction jet helicopter as claimed in claim 1, wherein at least part of the one or more valves is formed; to be moveable by compressed air.

9. The rotor blade for a reaction jet helicopter as claimed in claim 1, wherein at least part of the one or more valves is formed, to be moveable via direct actuation by compressed air.

10. The rotor blade for a reaction jet helicopter as claimed in claim 1, wherein the compressed air directly actuates movement of the one or more valves when the pressure in the cavity exceeds a desirable preset value.

11. The rotor blade for a reaction jet helicopter as claimed in claim 1, wherein the pressure regulating arrangement is configured so that the one or more valves are actuated at a pre-determined compressed air pressure enabling air in the rotor blade cavity to open the one or more valves when the air pressure is at or above a pre-determined level.

12. The rotor blade for a reaction jet helicopter as claimed in claim 1, wherein the one or more valves are configurable to react to changing static pressure within the rotor blade cavity.

13. The rotor blade for a reaction jet helicopter as claimed in claim 12, wherein the one or more valves are configurable to change configuration based on a change in static pressure within the rotor blade cavity.

14. The rotor blade for a reaction jet helicopter as claimed in claim 1, wherein the one or more valves are configurable to react to unsteady flow within the rotor blade cavity to provide a consistent pulsed output of compressed air from the one or more outlet apertures so that in use the consistent pulsed output increases the turbulent mixing within a boundary layer between a low momentum fluid layer close to the upper surface of the rotor blade and one or more outer parts of the boundary layer.

15. The rotor blade for a reaction jet helicopter as claimed in claim 1, wherein the pressure regulation arrangement is configured so that the one or more valves are actuated based on a pre-determined duty cycle.

16. The rotor blade for a reaction jet helicopter as claimed in claim 1, wherein the one or more valves are adjustable to open at a range of pre-determined levels of air pressure.

17. The rotor blade for a reaction jet helicopter as claimed in claim 1, wherein the one or more valves comprise a biasing means for biasing the one or more valves towards a closed configuration, wherein the one or more valves are manually adjustable prior to installation, by tightening, loosening, adding, removing or replacing component parts of the biasing means, the adjustability of the one or more valves enabling a range of preset air pressure to open the one or more valves providing a range of preset valves to match a range of flight conditions.

18. The rotor blade for a reaction jet helicopter as claimed in claim 1, wherein the one or more valves comprise one or more actuators to actuate electrical or electronic opening and/or closing of the one or more valves during various parts of flight envelope.

19. The rotor blade for a reaction jet helicopter as claimed in claim 1, wherein the one or more valves comprise one or more actuators to automatically actuate electrical/electronic opening and/or closing of the one or more valves during various parts of flight envelope.

* * * * *